United States Patent
Wisse

(10) Patent No.: US 9,241,236 B2
(45) Date of Patent: Jan. 19, 2016

(54) NETWORK EXPANSION METHOD FOR A BLUETOOTH NETWORK

(71) Applicant: LELY PATENT N.V., Maassluis (NL)

(72) Inventor: Dik-Jan Wisse, Maassluis (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 14/439,200

(22) PCT Filed: Oct. 21, 2013

(86) PCT No.: PCT/NL2013/050738
§ 371 (c)(1),
(2) Date: Apr. 28, 2015

(87) PCT Pub. No.: WO2014/077678
PCT Pub. Date: May 22, 2014

(65) Prior Publication Data
US 2015/0296326 A1    Oct. 15, 2015

(30) Foreign Application Priority Data

Nov. 13, 2012 (NL) .................................. 2009801

(51) Int. Cl.
| | |
|---|---|
| *H04B 7/00* | (2006.01) |
| *H04W 4/00* | (2009.01) |
| *H04W 48/02* | (2009.01) |
| *H04W 76/02* | (2009.01) |
| *H04W 84/18* | (2009.01) |

(52) U.S. Cl.
CPC .............. *H04W 4/008* (2013.01); *H04W 48/02* (2013.01); *H04W 76/023* (2013.01); *H04W 84/18* (2013.01)

(58) Field of Classification Search
CPC ..... H04W 84/20; H04W 4/008; H04W 48/02; H04W 76/023
USPC ........................................................ 455/41.2
See application file for complete search history.

(56) References Cited

U.S. PATENT DOCUMENTS

| | | | |
|---|---|---|---|
| 2003/0143953 A1* | 7/2003 | Schmandt | H04B 7/2643 455/41.2 |
| 2012/0282914 A1* | 11/2012 | Alexander | H04M 1/72527 455/420 |

FOREIGN PATENT DOCUMENTS

EP     2 213 985 A1    8/2010

* cited by examiner

*Primary Examiner* — Eugene Yun
(74) *Attorney, Agent, or Firm* — Birch, Stewart, Kolasch & Birch, LLP

(57) ABSTRACT

A method of connecting a further wireless Bluetooth node to a wireless Bluetooth node which participates in a wireless communication network, is disclosed. The method comprises: —initiating, by the further wireless Bluetooth node, a wireless network connection with the wireless Bluetooth node; —determining, by the wireless Bluetooth node, in how many slave connections the wireless Bluetooth node is involved; and —determining by the wireless Bluetooth node, if the connection initiation by the further wireless Bluetooth node is a priority connection request and —setting the predetermined number of free slave connections to one if the connection initiation by the further wireless Bluetooth node is a priority connection request and —setting the predetermined number of free slave connections to two if the connection initiation by the further wireless Bluetooth node is not a priority connection request.

20 Claims, 3 Drawing Sheets

WN1

NETWORK EXPANSION METHOD FOR A BLUETOOTH NETWORK

Figure 1A:
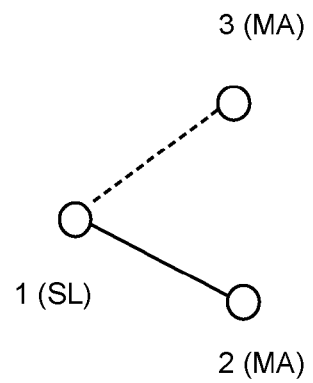

The invention relates to a method of connecting a further wireless Bluetooth node to a wireless Bluetooth node which participates in a wireless Bluetooth communication network, and to a wireless Bluetooth node for connection to such a wireless communication network. Bluetooth® is a registered trademark owned by Bluetooth SIG.

Bluetooth networks may be formed by wireless Bluetooth nodes that establish connections in order to allow data to be sent from one wireless Bluetooth node in the wireless communication network to another wireless Bluetooth node in the communication network. The wireless Bluetooth nodes may thereby form a wireless communication network in a self organizing way.

As the wireless Bluetooth nodes may be dynamic, i.e. may move from one position to the other, the network may be dynamic as connections between Bluetooth nodes may be terminated when such Bluetooth nodes get out of reach of each other. On the other hand, other Bluetooth nodes may get in reach, allowing to set up new connections. Examples may include mobile phones of passengers at an airport forming a wireless network, whereby over time passengers leave the airport and other passengers arrive at the airport. As another example, a wireless network may comprise movable robots each comprising a wireless Bluetooth node, for example to allow the movable robots to communicate with each other, or communicate via another one of the robots. A movement of one or more of such movable robots may result in the robot getting out of reach.

Generally, wireless communication Bluetooth nodes may be capable of handling a plurality of wireless connections simultaneously. The wireless network may make use of a connection hierarchy: in a connection between two wireless Bluetooth nodes, one of the wireless Bluetooth nodes may take the role of a master and the other the role of a slave. The master has some degree of control over the connection with the slave. In general, the master may be the wireless Bluetooth node that initiates the connection and the slave the wireless Bluetooth node that accepts the connection with the master. A wireless Bluetooth node may establish a connection with a plurality of other wireless Bluetooth nodes. Thereby, the wireless Bluetooth node may act as a master to some of the wireless Bluetooth nodes and as a slave to others. Generally, a wireless Bluetooth node is arranged to accommodate a plurality of connections, hardware and/or software resources of the Bluetooth node may however impose a limitation on a total number of master connections (i.e. connections whereby the wireless Bluetooth node acts as a master) and/or slave connections (i.e. connections whereby the wireless Bluetooth node acts as a slave) that a wireless Bluetooth node is capable of being involved in at a certain moment in time. Self organizing algorithms are known to organize connections in a cluster of Bluetooth nodes in an efficient way.

When a wireless Bluetooth node does not yet participate in the wireless network, it can inquire for other Bluetooth nodes that may be in reach. The inquiry may be performed actively or passively. When actively inquiring, the wireless Bluetooth node e.g. periodically transmits an inquiry message to inform other wireless Bluetooth nodes within reach that the wireless Bluetooth node that transmits the inquiry message intends to set up a connection. A receiving wireless Bluetooth node may respond by returning a corresponding message. Passive inquiry involves a listening by a wireless Bluetooth node for other wireless Bluetooth nodes. When receiving a message from another wireless Bluetooth node within reach, the wireless Bluetooth node that is in a passive enquiry state may respond accordingly to the message from the other wireless Bluetooth node within reach.

The wireless Bluetooth nodes have a certain capacity in terms of a total number of simultaneous connections they may be able to maintain, e.g. a maximum number of connections in which the wireless Bluetooth node serves as a master by initiating connections, and/or a maximum number of connection in which the wireless Bluetooth node serves as a slave by receiving connections When a Bluetooth node participates in a wireless network, the Bluetooth node will maintain one or more connections with one or more other Bluetooth nodes that together form such wireless network. As a result, at least part of the capacity of the wireless Bluetooth node in terms of the connections maintained by the wireless Bluetooth node, is exhausted. In particular, the wireless Bluetooth nodes have a relatively low capacity in terms of a maximum of two simultaneous slave connections (i.e. connections wherein the wireless Bluetooth node acts as a slave) that the nodes are able to maintain. In the situation where a wireless Bluetooth node has two such slave connections, and another wireless Bluetooth node would attempt to set up a connection with such a wireless Bluetooth node, the other wireless Bluetooth node—which initiates the connection—would act as a master, and thus would require the Bluetooth node (that already involves the maximum number of slave connections) to accept a further slave connection. Hence, a connection with the other wireless Bluetooth node that initiates a further connection, cannot readily be accomplished.

In some cases, such as for remote control applications, an immediate connection with one of the Bluetooth nodes of the wireless network by another (new, external) Bluetooth node is desirable, such as to be able to control certain functions in the network by means of said other Bluetooth node. In any case, it is desirable to have a way of building a network such as to reduce the time needed for an additional (external, new) Bluetooth node to establish a connection with one of the Bluetooth nodes in the wireless network The invention intends to solve, at least in part, the above problem. In order to achieve this goal, according to an aspect of the invention there is provided the method of claim 1. The method of connecting a further wireless Bluetooth node to a wireless Bluetooth node which participates in a wireless communication network comprises:

- initiating, by the further wireless Bluetooth node, a wireless network connection with the wireless Bluetooth node;
- determining, by the wireless Bluetooth node, in how many slave connections the wireless Bluetooth node is involved;
- accepting, by the wireless Bluetooth node, the wireless network connection initiation from the further wireless Bluetooth node only in case the wireless Bluetooth node has at least a predetermined number of free slave connections available, and
- determining by the wireless Bluetooth node, if the connection initiation by the further wireless Bluetooth node is a priority connection request and
- setting the predetermined number of free slave connections to one if the connection initiation by the further wireless Bluetooth node is a priority connection request and
- setting the predetermined number of free slave connections to two if the connection initiation by the further wireless Bluetooth node is not a priority connection request.

Thus, when a wireless Bluetooth node receives a request for establishing a connection with another wireless Bluetooth node (in which the wireless Bluetooth node that receives the request would act as a slave to the wireless Bluetooth node that sent the request), the wireless Bluetooth node that receives the request determines how many slave connections it already has in place and thus also how many free slave connections remain. It also determines if the connection initiation by the further wireless Bluetooth node is a priority connection request, thus the wireless Bluetooth node makes a distinction between a normal connection request and a priority connection request.

In case of a priority connection request the predetermined number of free slave connection is set to one, in a case of a regular connection request (no priority) the predetermined number of free slave connection is set to two.

Thus, it is ensured that the wireless Bluetooth nodes of the wireless communication network keep a slave position free, which is reserved for the situation for a priority connection request. The priority may be assigned to for example a wireless Bluetooth node of a user who intends to control one or more of the wireless Bluetooth nodes. For example, a connection request by a mobile device of the user, such as e.g. a smart phone, may be considered as a priority connection request.

The wireless communication network is a so-called Bluetooth network, an IEEE 802.11 network, etc. The term slave connection is to be understood as a connection whereby the wireless Bluetooth node in question acts accepts an incoming connection request from the other wireless Bluetooth node involved in the connection.

In an embodiment, the method further comprises
  denying, by the wireless Bluetooth node, to the further wireless Bluetooth node, the wireless network connection initiation in case the wireless Bluetooth node has less than the predetermined number of free slave connections available; and
  initiating, by the wireless Bluetooth node, a wireless network connection with the further wireless Bluetooth node.

In case the wireless Bluetooth node does not accept the connection initiation, as the wireless Bluetooth node has less than the predetermined number of free slave connections, the wireless Bluetooth node can nevertheless establish a connection with the other wireless Bluetooth node by reversing the connection, thus in response to the connection initiation from the other wireless Bluetooth node, the wireless Bluetooth node denies the connection because of insufficient (less than the predetermined number) free slave positions, and initiates a connection with the other wireless Bluetooth node itself, enabling the wireless Bluetooth node to act as a master and the other wireless Bluetooth node to act as a slave, thus avoiding occupying a slave position at the wireless Bluetooth node.

In an embodiment the method further comprises the steps of
  determining by the wireless Bluetooth node, if a MAC address of the further wireless Bluetooth node is in a predetermined MAC address range,
  assigning the connection initiation to be a priority connection request if the MAC address of the further wireless Bluetooth node is outside the predetermined MAC address range.

Thus, in order to determine if a connection initiation is a priority connection request, a MAC address of the further wireless Bluetooth node is taken into account. The wireless Bluetooth nodes of the wireless network are assigned a predetermined MAC address range, while the further wireless Bluetooth node (for example a smartphone or other wireless user device) is outside this MAC address range. Setting the predetermined number of free slave connections from to one may then be performed if the MAC address of the further wireless Bluetooth node is outside of the predetermined MAC address range. Thus a smart phone user can quickly connect to the network.

In an embodiment, the wireless Bluetooth node alternates between an inquiry state in which the wireless Bluetooth node listens for inquiry messages from other Bluetooth nodes, and in an inquiry scan state in which the wireless Bluetooth node actively transmits inquiry messages. Generally, a wireless Bluetooth node that wants to be "discovered" by another Bluetooth node may periodically enter the inquiry scan state; in this state, the wireless Bluetooth node activates its receiver and listens for inquiries. When accepting inquiries, the wireless Bluetooth node that accepts will assume a slave role. In inquiry state, a wireless Bluetooth node transmits an inquiry message and listens for responses.

In an embodiment, the method further comprises the steps of:
  establishing if a destination wireless Bluetooth node (D) to which the wireless Bluetooth node (S) intends to send data, participates in the wireless communication network (WN1) in which the wireless Bluetooth node (S) participates;
repeatedly performing a wireless network expansion until the destination wireless Bluetooth node participates in the wireless communication network, the wireless network expansion comprising:
  sending by the wireless Bluetooth node (S) an inquiry message onto the wireless communication network (WN1);
  inquiring, in response to the inquiry message, by the remaining wireless Bluetooth nodes (1, 2) of the wireless communication network (WN1), for at least one other wireless Bluetooth node (3, D), and in response to a positive inquiry result:
    sending a connection initiation request to the inquired at least one other wireless Bluetooth node (3, D), the connection initiation request e.g. comprising a priority message;
    determining, by the at least one other wireless Bluetooth node (3, D), in response to receiving the connection initiation request, in how many slave connections the at least one other wireless Bluetooth node is involved;
    terminating, by the at least one other wireless Bluetooth node, a slave connection in case the at least one other wireless Bluetooth node has less than two free slave connections available; and
    establishing, a connection by the communication network (WN1) with the at least one other wireless Bluetooth node (3, D); and
  establishing, when the connection by the communication network (WN1) with the at least one other wireless Bluetooth node has been made, if the destination wireless Bluetooth node participates in the wireless communication network; and
  sending the data from the wireless Bluetooth node (S) to the destination wireless Bluetooth node (D) in case it has been established that the destination wireless Bluetooth node (D) participates in the wireless communication network.

Thus, in case a Bluetooth node of the wireless network intends to send data to another wireless Bluetooth node, the wireless Bluetooth node that intends to send the data will establish if the destination wireless Bluetooth node forms part of the same wireless network, e.g. by sending a suitable message onto the wireless communication network or by attempting to send the data to the destination wireless Bluetooth node. In case the destination wireless Bluetooth node does not form part of the same wireless network of the wireless Bluetooth node that intends to send the data to the destination wireless Bluetooth node, the wireless Bluetooth node that intends to transmit the data may perform a wireless network expansion to find further wireless Bluetooth nodes within reach and make those further wireless Bluetooth nodes connect to the wireless communication network. The wireless Bluetooth node may thereto send an inquiry message on the wireless network, which is broadcast by the other wireless Bluetooth nodes. In case another wireless Bluetooth node which does not yet participate in the wireless communication network, is discovered, the wireless Bluetooth node that intends to send the data will via the wireless communication network (e.g. via the Bluetooth node that discovered the other wireless Bluetooth node) send a message to the other wireless Bluetooth node to connect to the wireless network. In case the other wireless Bluetooth node has the predetermined number of free slave connections or more, the other wireless Bluetooth node will connect to the wireless communication network. Otherwise, the other wireless Bluetooth node will release one or more of its present connections in order to provide sufficient free slave connections, and then connect to the wireless communication network. The connection initiation request may include a notification, so as to provide that the other wireless Bluetooth node, if needed, releases another connection. This procedure of network expansion may be repeated several times, until the destination wireless Bluetooth node has been found and included in the wireless communication network. Thus, in case of for example a dynamic situation where Bluetooth nodes get out of reach, the network may step by step discover further Bluetooth nodes, thereby each time increasing its coverage when an additional Bluetooth node has been found and included in the network, until the destination Bluetooth node has been found.

The wireless network expansion may be stopped after a predetermined number of iterations of the wireless network expansion has been performed, or when a predetermined time during which the wireless network expansion has been performed, has elapsed.

In an embodiment, the method includes further method steps for connecting a wireless Bluetooth node which runs a user control application running, wherein the method further steps comprising:
  sending, by the wireless Bluetooth node running the user control application, an application message to a destination wireless Bluetooth node for control purposes at the destination wireless Bluetooth node;
  checking, if the destination wireless Bluetooth is in an immediate connection with the wireless Bluetooth node running the user control application, and
  blocking the application message in case the destination wireless Bluetooth node running the user control application is not in immediate connection with the wireless Bluetooth node running the user control application.

The wireless Bluetooth node that receives a control message from a user control application (for example an App running on a smartphone or other mobile device of a user) may hence check if the wireless Bluetooth node that runs the user control application is in direct connection with the wireless Bluetooth node and block the control message if the connection runs via other nodes. Thereby ensuring that the wireless Bluetooth node that runs the user control application is in direct connection with the wireless less Bluetooth node it controls, in order to reduce a risk of loss of connection between the user control application and the wireless Bluetooth node controlled by it. The term immediate connection is to be understood as a wireless connection between wireless Bluetooth nodes, that directly connects the wireless Bluetooth nodes, thus does not connect the wireless Bluetooth nodes via one or more other wireless Bluetooth nodes. Direct connection between the Bluetooth node running the App and the destination Bluetooth node is of particular interest when the App is a user control application on a smartphone which may be used (by means of the App) as a remote control for a farm device comprising the destination Bluetooth node. By requiring a direct connection between these nodes, remotely controlling devices which are out of range of the smartphone is not possible, which is an important safety feature. Additionally, a direct connection improves speed and consistency of the communication of the control signals.

In an embodiment, the wireless Bluetooth node is comprised in an automated dairy farming device, such as e.g. an autonomously movable feed wagon capable of moving along a feed fence and dispensing feed.

According to a further aspect of the invention there is provided a wireless Bluetooth node for connection to a Bluetooth wireless communication network, the wireless Bluetooth node being arranged to perform the method according to the invention, in particular to:
  determine, in response to a further wireless Bluetooth node initiating a wireless network connection with the wireless Bluetooth node, in how many slave connections the wireless Bluetooth node is involved;
  accept the wireless network connection initiation from the further wireless Bluetooth node only in case the wireless Bluetooth node has at least two free slave connections available.

According to a still further aspect of the invention, there is provided a set of automated farming devices, each comprising a wireless Bluetooth node according to the invention. Such as e.g. an autonomously movable feed wagon capable of moving along a feed fence and dispensing feed, automated farm doors which open and close access to a barn in communication with the feed wagon, an automated feed grabber movable to grab feed and load the feed wagon. With the wireless Bluetooth node and the set of automated dairy farming devices according to the invention, the same or similar advantages may be achieved as with the method according to the invention. Also, the same or similar preferred embodiments may be provided achieving the same or similar effects.

Figure 1B:
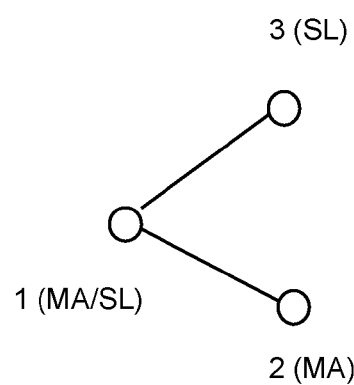

Further embodiments, advantages, and effects of the invention will become clear from the appended drawing, wherein a non limiting embodiment is depicted, wherein FIG. 1A-1B schematically depict wireless Bluetooth nodes and connections there between based on which an embodiment of the invention will be explained; and FIG. 2 A-2C schematically depict wireless Bluetooth nodes and connections there between based on which an embodiment of the invention will be explained.

FIG. 1A depicts wireless Bluetooth nodes 1, 2 and 3. Wireless Bluetooth node 1 is connected to wireless Bluetooth node 2, whereby wireless Bluetooth node 1 acts as a slave (SL) to wireless Bluetooth node 2, and wireless Bluetooth node 2 as a master (MA) to wireless Bluetooth node 1. The wireless Bluetooth node acting as a master of a connection is the one that is in control of the connection, the other wireless Bluetooth node involved in the connection consequently acts as a slave. For example, a master slave role pattern is set up at the initiation of a connection: the wireless Bluetooth node that initiates the connection takes the master role of that connection and the wireless Bluetooth node that accepts the connection from the other wireless Bluetooth node becomes the slave in that connection. A wireless Bluetooth node that is involved in multiple connections may take master and slave roles simultaneously, For example, the wireless Bluetooth node may take a master role in one connection and a slave role in the other.

In the configuration depicted in FIG. 1A, further wireless Bluetooth node 3 initiates a connection with wireless Bluetooth node 1. Thereby, wireless Bluetooth node 4 takes a master role thus wireless Bluetooth node 1 would take a slave role. Wireless Bluetooth node 1 is already involved in another connections whereby wireless Bluetooth node 1 is in a slave role. Wireless Bluetooth node 1 is capable of maintaining a maximum of two slave connections, i.e. has a capacity of two slave connections. Then, in the present situation, wireless Bluetooth node 1 determines that it is already involved in a slave connection and thus has only one free slave connection available. The wireless Bluetooth node 1 compares the number of free slave connections available with a predetermined minimum number of free slave connections, namely in this situation two free slave connections. The wireless Bluetooth node 1, in this situation, has less then the predetermined number of free slave connections available, causing the wireless Bluetooth node 1 to deny the connection initiation from the wireless Bluetooth node 4. It is noted that—if wireless Bluetooth node 1 would have been a master to wireless Bluetooth node 2, it would have sufficient free slave connections available, namely two free slave connections) in order to accept the connection initiation from the wireless Bluetooth node 3.

FIG. 1B depicts a possible solution whereby, after having received and denied the connection initiation from the wireless Bluetooth node 3 because of a number of free slave connections that is below the predetermined number of two free slave connections, the wireless Bluetooth node 1 in following and in response to the denial, initiates a connection with the wireless Bluetooth node 3 that it just denied. As the wireless Bluetooth node 1 now initiates the connection, the wireless Bluetooth node 1 will take the master role in the connection with the wireless Bluetooth node 3, thus not occupying a slave connection at the Bluetooth node 1. Hence, a connection between wireless Bluetooth node 1 and wireless Bluetooth node 3 may be established, as schematically depicted in FIG. 1b, whereby wireless Bluetooth node 1 acts as the master and wireless Bluetooth node 3 as the slave.

In case further wireless Bluetooth node 3 would have been assigned a priority, a different situation would have occurred. Then, in the situation depicted in and described with reference to FIG. 1A, the further wireless Bluetooth node 3 initiates a connection with wireless Bluetooth node 1. Thereby, again wireless Bluetooth node 3 takes a master role thus wireless Bluetooth node 1 would take a slave role. Wireless Bluetooth node 1 is already involved in another connection whereby wireless Bluetooth node 1 is in a slave role. Again wireless Bluetooth node 1 is capable of maintaining a maximum of 2 slave connections, i.e. has a capacity of 2 slave connections. Then, in the present situation, wireless Bluetooth node 1 determines that it is involved in one slave connections and thus has only one free slave connection available. As wireless Bluetooth node 3 has been assigned a priority status, the wireless Bluetooth node 1, predetermined number of free slave connections, which was previously set to two, is now decreased to one. The wireless Bluetooth node 1, in this situation, has the predetermined number of free slave connections available, namely one, causing the wireless Bluetooth node 1 to accept the connection initiation from the wireless Bluetooth node 3.

As a result, by means of the method according to the invention, the wireless Bluetooth node 1 ensures that it keeps a free slave connection available, so that—in case of a connection initiation having a priority status—the wireless Bluetooth node 1 has a slave connection available for accepting such a priority connection initiation request. Thus, in case priority is for example assigned to a user device (such as smartphone, notebook computer, tablet computer or similar) that runs a control application, it is ensured that the wireless network keeps at each Bluetooth node at least one slave connection free, so that, in case the user device initiates a connection to the wireless network, access is granted and the wireless Bluetooth node of the wireless network that receives the connection initiation, has a free slave position available in order to allow such connection.

The priority may assigned (in this example to further wireless Bluetooth node 3) in various ways. For example, a priority flag may be set in the connection initiation message. Alternatively, an address of the further wireless Bluetooth node may be used to determine if the further wireless Bluetooth node should be assigned priority or not. As an example the wireless Bluetooth nodes of the wireless communication network may be assigned a certain address range (e.g. MAC address range). In case the address of the further wireless Bluetooth node would be within the predetermined range, the wireless Bluetooth node would be considered one of the regular Bluetooth nodes of the wireless network, hence not being granted a priority status. If however the further wireless Bluetooth node would have another address (e.g. MAC address) it would be considered a user device that may run a user control application, and hence would be granted priority. E.g. a farmer having a Bluetooth network of an autonomously movable feed wagon capable of moving along a feed fence and dispensing feed, automated farm doors which open and close access to a barn in communication with the feed wagon, an automated feed grabber movable to grab feed and load the feed wagon, may also have a smartphone with an App by which he can use his smartphone as a remote controller to control e.g. movement of the feed wagon. This can be convenient for moving the feed wagon outside its normal route to a place for maintenance. The smartphone App connects to the controls of the feed wagon and the farmer can push buttons to move forward rearward, make turns and the like.

Figure 2A:
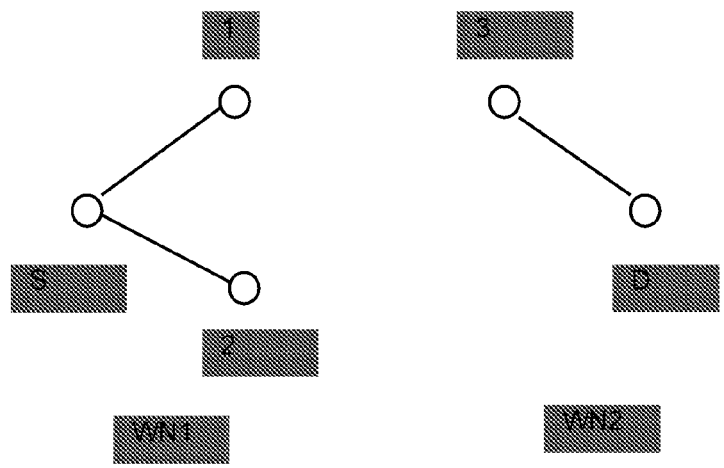
Figure 2B:
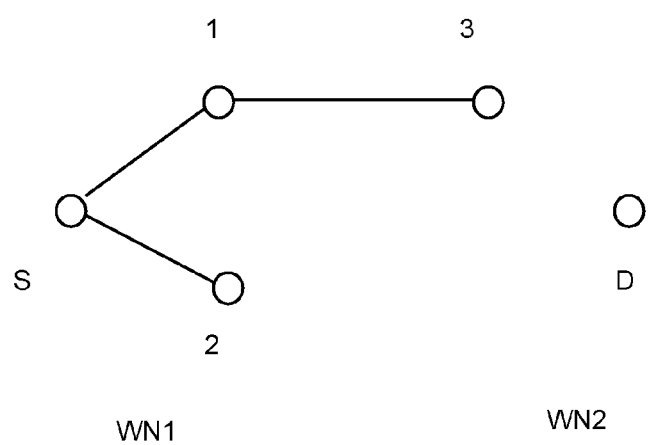
Figure 2C:
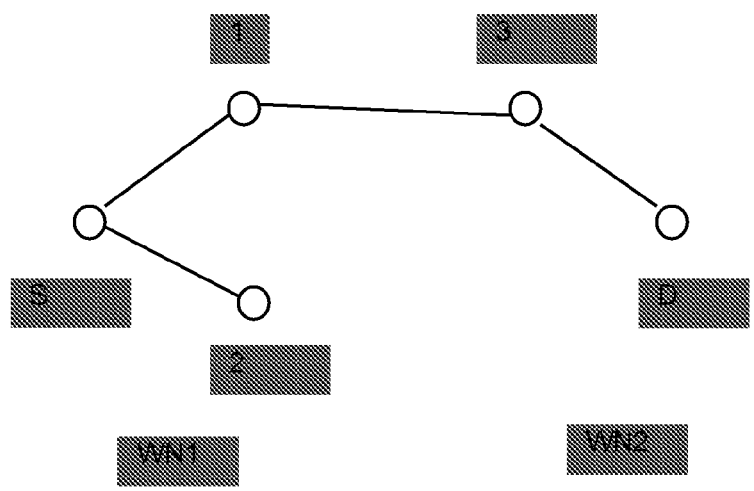

FIG. 2A-2C depict various configurations, based on which a wireless network expansion according to an aspect of the invention will be explained.

Starting with the situation as depicted in FIG. 2A, wireless network WN1 comprises wireless Bluetooth node S, and wireless Bluetooth nodes 1 and 2 which are both connected to wireless Bluetooth node S. Wireless Bluetooth node 3, 4 and D are connected to each other and form wireless network WN2, which is not connected to wireless network WN1. When wireless (source) Bluetooth node S intends to send a message to wireless (destination) Bluetooth node D, it will be found that wireless Bluetooth node D does not form part of wireless network WN1, as wireless Bluetooth node S does, so that the message from wireless Bluetooth node S cannot readily reach wireless Bluetooth node D.

Wireless Bluetooth node S will now perform a network expansion, whereby wireless Bluetooth node S sends an inquiry message onto the wireless communication network WN1. In response to the inquiry message, the remaining wireless Bluetooth nodes 1, 2 of the wireless communication network WN1 will inquiring for at least one other wireless Bluetooth node, whereby wireless Bluetooth node 3 will be discovered by wireless Bluetooth node 1. In response to such a positive inquiry result of discovering an other wireless Bluetooth node 3 not forming part of the wireless communication network a connection initiation request will be sent to the inquired at least one other wireless Bluetooth node (namely in this example Bluetooth node 3). Then, the at least one other wireless Bluetooth node 3, in response to receiving the connection initiation request, will determine in how many slave connections it is involved. The wireless Bluetooth node 3 will terminate a slave connection in case it has less than two free slave connections available (the inquiry message may comprise a priority, such as a priority flag, to make node 3 terminate one of its pending connections), a connection will be established by the communication network WN1 (namely by wireless Bluetooth node 1) with the node 3; and when the connection by the communication network WN1 with node 3 has been made, it will be established if the destination wireless Bluetooth node participates in the wireless communication network. Wireless Bluetooth node 3 has been connected to wireless network WM1 now and in doing so disconnected from wireless network WN2, as schematically depicted in FIG. 2b. Because destination wireless Bluetooth node D is not yet included in wireless network WN1, the procedure of wireless network expansion is repeated, causing wireless Bluetooth node 3 to discover wireless Bluetooth node D. As a result, after this second wireless network expansion iteration, wireless Bluetooth node D has been included (i.e. now participates) in the wireless communication network WN1, as depicted in FIG. 2C, allowing a sending of the data from the wireless Bluetooth node S to the destination wireless Bluetooth node D.

It is noted that, in case the destination Bluetooth node D would not be found the expansion may be stopped after expiry of a predetermined time or a predetermined number of iterations or both.

In order to ensure that a user control command is executed only when the wireless Bluetooth node that runs such a control application (e.g. a smartphone, notebook computer or touchpad computer) is in an immediate connection with the Bluetooth node that is to be controlled, the method may further comprise: sending, by a wireless Bluetooth node running a user control application, an application message to a destination wireless Bluetooth node for control purposes at the destination wireless Bluetooth node; checking, if the destination wireless Bluetooth node is in an immediate connection with the wireless Bluetooth node running the user control application, and blocking the application message in case the destination node is not in immediate connection with the wireless Bluetooth node running the user control application. The control application may for example include a software management application for controlling an apparatus of which the wireless Bluetooth node forms part. As explained above, the wireless Bluetooth node running the user control application, may be a smartphone of a farmer. The farmer may want to control the feed wagon to move it outside its normal route to a place for maintenance. For safety reasons this connection is not possible via other nodes, because in that case the smartphone being out of reach of the feed wagon cannot be used to control its movements.

The invention claimed is:

1. A method of connecting a further wireless Bluetooth node to a wireless Bluetooth node which participates in a wireless communication network, the method comprising the steps of:

initiating, by the further wireless Bluetooth node, a wireless network connection with the wireless Bluetooth node;

determining, by the wireless Bluetooth node, in how many slave connections the wireless Bluetooth node is involved;

accepting, by the wireless Bluetooth node, the wireless network connection initiation from the further wireless Bluetooth node only in case the wireless Bluetooth node has at least a predetermined number of free slave connections available;

determining by the wireless Bluetooth node, if the connection initiation by the further wireless Bluetooth node is a priority connection request;

setting the predetermined number of free slave connections to one if the connection initiation by the further wireless Bluetooth node is a priority connection request; and setting the predetermined number of free slave connections to two if the connection initiation by the further wireless Bluetooth node is not a priority connection request.

2. The method according to claim 1, further comprising the steps of:

denying, by the wireless Bluetooth node, to the further wireless Bluetooth node, the wireless network connection initiation in case the wireless Bluetooth node has less than the predetermined number of free slave connections available; and initiating, by the wireless Bluetooth node, a wireless network connection with the further wireless Bluetooth node.

3. The method according to claim 2, further comprising the steps of:

determining by the wireless Bluetooth node, if a MAC address of the further wireless Bluetooth node is in a predetermined MAC address range; and assigning the connection initiation to be a priority connection request if the MAC address of the further wireless Bluetooth node is outside the predetermined MAC address range.

4. The method according to claim 2, wherein the wireless Bluetooth node alternates between an inquiry state and an inquiry scan state.

5. The method according to claim 2, further comprising the steps of:

establishing if a destination wireless Bluetooth node to which the wireless Bluetooth node intends to send data, participates in the wireless communication network in which the wireless Bluetooth node participates;

repeatedly performing a wireless network expansion until the destination wireless Bluetooth node participates in the wireless communication network, the wireless network expansion comprising:

sending by the wireless Bluetooth node an inquiry message onto the wireless communication network;

inquiring, in response to the inquiry message, by the remaining wireless Bluetooth nodes of the wireless communication network, for at least one other wireless Bluetooth node, and in response to a positive inquiry result:

sending a connection initiation request to the inquired at least one other wireless Bluetooth node, the connection initiation request;

determining, by the at least one other wireless Bluetooth node, in response to receiving the connection initiation request, in how many slave connections the at least one other wireless Bluetooth node is involved;

terminating, by the at least one other wireless Bluetooth node, a slave connection in case the at least one other wireless Bluetooth node has less than two free slave connections available; and establishing, a connection by the communication network with the at least one other wireless Bluetooth node; and establishing, when the connection by the communication network with the at least one other wireless Bluetooth node has been made, if the destination wireless Bluetooth node participates in the wireless communication network; and sending the data from the wireless Bluetooth node to the destination wireless Bluetooth node in case it has been established that the destination wireless Bluetooth node participates in the wireless communication network.

6. The method according to claim 2, further comprising a user control application running on a wireless Bluetooth node, wherein the method further comprises the steps of:

sending, by the wireless Bluetooth node running the user control application, an application message to a destination wireless Bluetooth node for control purposes at the destination wireless Bluetooth node;

checking, if the destination wireless Bluetooth is in an immediate connection with the wireless Bluetooth node running the user control application; and blocking the application message in case the destination wireless Bluetooth node running the user control application is not in immediate connection with the wireless Bluetooth node running the user control application.

7. The method according to claim 1, further comprising the steps of:

determining by the wireless Bluetooth node, if a MAC address of the further wireless Bluetooth node is in a predetermined MAC address range; and assigning the connection initiation to be a priority connection request if the MAC address of the further wireless Bluetooth node is outside the predetermined MAC address range.

8. The method according to claim 7, wherein the wireless Bluetooth node alternates between an inquiry state and an inquiry scan state.

9. The method according to claim 7, further comprising the steps of:

establishing if a destination wireless Bluetooth node to which the wireless Bluetooth node intends to send data, participates in the wireless communication network in which the wireless Bluetooth node participates;

repeatedly performing a wireless network expansion until the destination wireless Bluetooth node participates in the wireless communication network, the wireless network expansion comprising:

sending by the wireless Bluetooth node an inquiry message onto the wireless communication network;

inquiring, in response to the inquiry message, by the remaining wireless Bluetooth nodes of the wireless communication network, for at least one other wireless Bluetooth node, and in response to a positive inquiry result:

sending a connection initiation request to the inquired at least one other wireless Bluetooth node, the connection initiation request;

determining, by the at least one other wireless Bluetooth node, in response to receiving the connection initiation request, in how many slave connections the at least one other wireless Bluetooth node is involved;

terminating, by the at least one other wireless Bluetooth node, a slave connection in case the at least one other wireless Bluetooth node has less than two free slave connections available; and establishing, a connection by the communication network with the at least one other wireless Bluetooth node; and establishing, when the connection by the communication network with the at least one other wireless Bluetooth node has been made, if the destination wireless Bluetooth node participates in the wireless communication network; and sending the data from the wireless Bluetooth node to the destination wireless Bluetooth node in case it has been established that the destination wireless Bluetooth node participates in the wireless communication network.

10. The method according to claim 7, further comprising a user control application running on a wireless Bluetooth node, wherein the method further comprises the steps of:

sending, by the wireless Bluetooth node running the user control application, an application message to a destination wireless Bluetooth node for control purposes at the destination wireless Bluetooth node;

checking, if the destination wireless Bluetooth is in an immediate connection with the wireless Bluetooth node running the user control application; and blocking the application message in case the destination wireless Bluetooth node running the user control application is not in immediate connection with the wireless Bluetooth node running the user control application.

11. The method according to claim 1, wherein the wireless Bluetooth node alternates between an inquiry state and an inquiry scan state.

12. The method according to claim 11, further comprising the steps of:

establishing if a destination wireless Bluetooth node to which the wireless Bluetooth node intends to send data, participates in the wireless communication network in which the wireless Bluetooth node participates;

repeatedly performing a wireless network expansion until the destination wireless Bluetooth node participates in the wireless communication network, the wireless network expansion comprising:

sending by the wireless Bluetooth node an inquiry message onto the wireless communication network;

inquiring, in response to the inquiry message, by the remaining wireless Bluetooth nodes of the wireless communication network, for at least one other wireless Bluetooth node, and in response to a positive inquiry result:

sending a connection initiation request to the inquired at least one other wireless Bluetooth node, the connection initiation request;

determining, by the at least one other wireless Bluetooth node, in response to receiving the connection initiation request, in how many slave connections the at least one other wireless Bluetooth node is involved;

terminating, by the at least one other wireless Bluetooth node, a slave connection in case the at least one other wireless Bluetooth node has less than two free slave connections available; and establishing, a connection by the communication network with the at least one other wireless Bluetooth node; and establishing, when the connection by the communication network with the at least one other wireless Bluetooth node has been made, if the destination wireless Bluetooth node participates in the wireless communication network; and sending the data from the wireless Bluetooth node to the destination wireless Bluetooth node in case it has been established that the destination wireless Bluetooth node participates in the wireless communication network.

13. The method according to claim 11, further comprising a user control application running on a wireless Bluetooth node, wherein the method further comprises the steps of:
    sending, by the wireless Bluetooth node running the user control application, an application message to a destination wireless Bluetooth node for control purposes at the destination wireless Bluetooth node;
    checking, if the destination wireless Bluetooth is in an immediate connection with the wireless Bluetooth node running the user control application; and
    blocking the application message in case the destination wireless Bluetooth node running the user control application is not in immediate connection with the wireless Bluetooth node running the user control application.

14. The method according to claim 1, further comprising the steps of:
    establishing if a destination wireless Bluetooth node to which the wireless Bluetooth node intends to send data, participates in the wireless communication network in which the wireless Bluetooth node participates;
    repeatedly performing a wireless network expansion until the destination wireless Bluetooth node participates in the wireless communication network, the wireless network expansion comprising:
    sending by the wireless Bluetooth node an inquiry message onto the wireless communication network;
    inquiring, in response to the inquiry message, by the remaining wireless Bluetooth nodes of the wireless communication network, for at least one other wireless Bluetooth node, and in response to a positive inquiry result:
    sending a connection initiation request to the inquired at least one other wireless Bluetooth node, the connection initiation request;
    determining, by the at least one other wireless Bluetooth node, in response to receiving the connection initiation request, in how many slave connections the at least one other wireless Bluetooth node is involved;
    terminating, by the at least one other wireless Bluetooth node, a slave connection in case the at least one other wireless Bluetooth node has less than two free slave connections available; and
    establishing, a connection by the communication network with the at least one other wireless Bluetooth node; and
    establishing, when the connection by the communication network with the at least one other wireless Bluetooth node has been made, if the destination wireless Bluetooth node participates in the wireless communication network; and
    sending the data from the wireless Bluetooth node to the destination wireless Bluetooth node in case it has been established that the destination wireless Bluetooth node participates in the wireless communication network.

15. The method according to claim 14, further comprising the step of stopping the wireless network expansion after a predetermined number of iterations of the wireless network expansion have been performed, or when a predetermined time during which the wireless network expansion has been performed, has elapsed.

16. The method according to claim 1, further comprising a user control application running on a wireless Bluetooth node, wherein the method further comprises the steps of:
    sending, by the wireless Bluetooth node running the user control application, an application message to a destination wireless Bluetooth node for control purposes at the destination wireless Bluetooth node;
    checking, if the destination wireless Bluetooth is in an immediate connection with the wireless Bluetooth node running the user control application; and
    blocking the application message in case the destination wireless Bluetooth node running the user control application is not in immediate connection with the wireless Bluetooth node running the user control application.

17. The method according to claim 1, wherein the wireless Bluetooth node is comprised in an automated dairy farming device.

18. The method according to claim 1, wherein the wireless communication network comprises a Bluetooth network.

19. A wireless Bluetooth node for connection to a wireless communication network, the wireless Bluetooth node being arranged to perform the method according to claim 1, the wireless Bluetooth node being configured to:
    determine, in response to a further wireless Bluetooth node initiating a wireless network connection with the wireless Bluetooth node, in how many slave connections the wireless Bluetooth node is involved; and
    accept the wireless network connection initiation from the further wireless Bluetooth node only in case the wireless Bluetooth node has at least two free slave connections available.

20. A set of automated dairy farming devices, each comprising the wireless Bluetooth node according to claim 19.

* * * * *